July 13, 1943.   B. M. PARSONS   2,324,233
FRANKFURTER ROASTER
Filed July 21, 1941
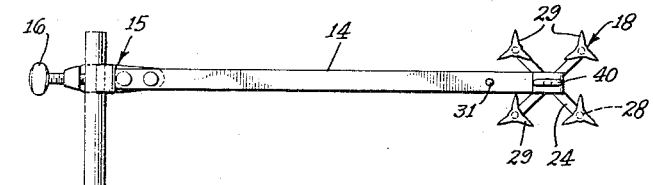
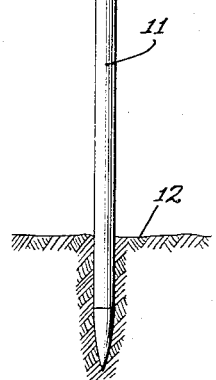
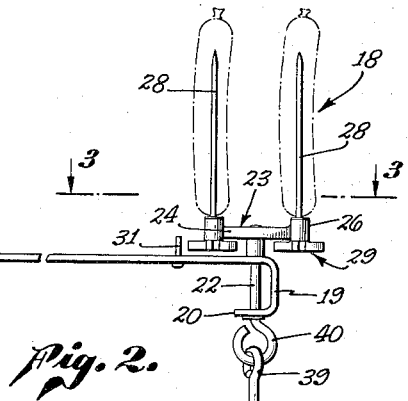
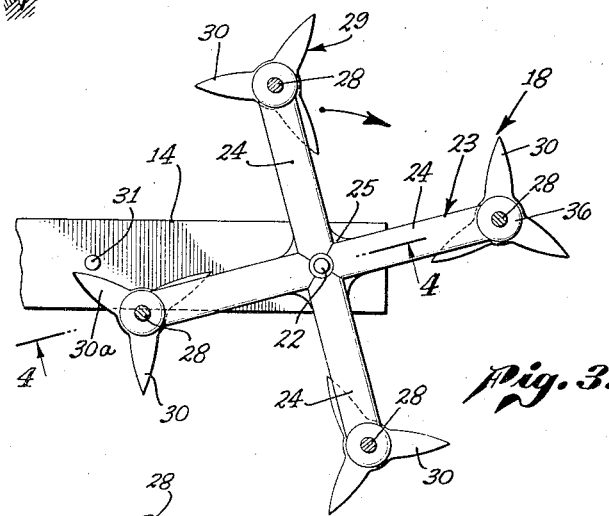
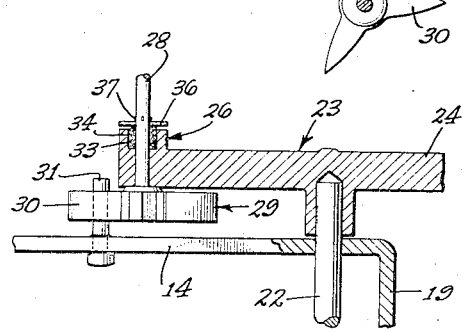
BRUCE M. PARSONS,
INVENTOR
BY *Frank R. Graham*
ATTORNEY.

Patented July 13, 1943

2,324,233

UNITED STATES PATENT OFFICE 2,324,233

FRANKFURTER ROASTER

Bruce M. Parsons, San Gabriel, Calif.

Application July 21, 1941, Serial No. 403,248

2 Claims. (Cl. 126—14)

This invention relates generally to devices for supporting food, especially meat to be cooked over an open fire. In particular the invention is designed for supporting frankfurters over a camp fire although it may be useful for other purposes.

It is a primary object of this invention to provide a readily portable device which can be quickly set up in the open to support frankfurters, marshmallows or other articles of food over an open fire such as a camp fire. In this connection it is an object to provide a device which can be conveniently used regardless of the unevenness of the ground.

It is a general object of the invention to provide means for rotating the food supporting portion of the device during cooking to prevent the burning or overcooking of one side of the supported food. In this respect it is a particular object to provide a device of the type indicated including means for rotating the food holding portion from a comfortable position at a distance from the fire. It is a further object to provide a device embodying a rotatable part on which a plurality of food supporting members may be mounted and to provide means for rotating the entire food holding means as a unit and also to provide means for imparting limited rotative movement to the individual food supporting elements about axes of rotation spaced around the axis of rotation of the main food supporting element.

It is also an object to provide a food supporting means which can be adjusted to position the food at a desired distance above the fire so as to accommodate the device to various types of fires and obtain the proper heat for the particular food to be cooked.

These and other objects will be apparent from the drawing and the following description thereof. Referring to the drawing, which is for illustrative purposes only;

Fig. 1 is a side elevation of a device embodying the invention;

Fig. 2 is a top plan view of the device of Fig. 1;

Fig. 3 is an enlarged elevational view of the food supporting parts of the device shown inverted with relation to Fig. 1 taken on line 3—3 of Fig. 2 but with the food supporting parts slightly rotated; and Fig. 4 is a fragmentary cross section on line 4—4 of Fig. 3.

More particularly describing the invention, reference numeral 11 indicates a stake of metal or other suitable material which may be driven into the ground 12 in order to support an arm 14 adapted to extend laterally of the stake and over a camp fire or other source of heat over which food can be cooked. The arm 14 is provided with a clamp 15 at one end including the thumb screw 16 adapted to tighten the clamp about the stake so that the arm may be adjustably secured at any desired level or radial position on the stake.

At its opposite end the arm 14, which may be formed of a flat strip of metal as shown, is provided with a food supporting and rotating means generally indicated by reference numeral 18. In the form of the invention shown, the arm 14 is bent back upon itself at the end to provide a laterally extending bridging portion 19 and a rearwardly extending side portion 20 which is parallelly disposed to the main body of the arm. The side portion 20 and the immediately opposite part of the main body of the arm are provided with suitable apertures to accommodate a short shaft or eye bolt 22 which is loosely received in the apertures so that it may rotate therein. Rigidly mounted on one end of the eye bolt is what will be termed a spider bracket 23. In the form shown this bracket includes four extensions or legs 24 which radiate out from a central hub 25. Any number of such legs may be provided. Each leg 24 is provided at its end with a suitable apertured boss or the like 26 adapted to rotatably receive a pointed spindle or pin 28. These spindles are adapted to receive articles of food such as marshmallows or the ordinary frankfurter, indicated by broken lines in Fig. 2. The articles of food may be impaled on the individual spindles as shown. After the articles of food are cooked they can easily be removed, as for example in the use of frankfurters, it is only necessary to enclose the frankfurter in a split bun and then pull it off the spindle.

The invention is particularly designed for cooking frankfurters over out-door fires and in order to prevent the frankfurters becoming burned or excessively cooked on one side, means are provided for individually intermittently imparting limited rotative movement to the individual spindles and at the same time providing for rotation of all of the spindles around the axis of the shaft 22. In order to accomplish this, each spindle is provided with what will be termed a star wheel 29 located between the bracket 23 and the main body of the arm 14. In the form shown, these star wheels are integrally secured to the spindle and each consists of three radially extending teeth 30. Mounted in the arm 14 in any suitable manner is a pin 31 which is positioned within the area of rotation through which the teeth 30 of the star wheels extending beyond the bracket 23 pass during rotation of the bracket. By reference to Fig. 3 it will be apparent that further movement of the bracket in the direction of the arrow will cause the tooth 30a to strike the pin and thereby through interaction of the parts cause partial rotation of the individual spindles. It is of course apparent that the bracket may be rotated in either direction and the interaction of the pin and particular star wheels will take place.

In order to prevent the spindles and the articles of food impaled thereon from rotating beyond the desired amount each time that a star wheel contacts the pin 31, it is desirable to provide means for causing the spindles to yieldably resist rotation. Any suitable means may be used for accomplishing this, however, in the form of the invention shown, each of the bosses 28 has been provided with a recess 33 adapted to receive a small spring 34 which is mounted under compression by means of a washer 36 which is secured in position on the shaft by the metal portions 37 pressed from the spindle. With this construction the friction imparted by the spring under compression between the washer 36 and the bracket 23 will serve to prevent the free rotation of the spindle.

In order to provide for rotation of the bracket 23 and the consequent intermittent rotation of the individual spindles, an elongate crank 38 is provided which may have a hook 39 at one end adapted to be detachably secured to an eye 40 at the end of the shaft 22. Preferably the crank 38 should be long enough to permit an operator to turn it from a convenient and comfortable position at a distance from the camp fire or the like. After the food has been cooked, the arm 14 may be pulled to one side of the fire by the crank for removal of the cooked food articles.

Although a particular embodiment of the invention has been shown and described, it is contemplated that various other forms and modifications may be made without departing from the invention and it is intended to cover such changes and modifications as come within the scope of the claims.

I claim as my invention:

1. In combination: an arm adapted to be mounted on an upright support or the like, said arm having means at one end thereof for rotatably supporting a shaft; a shaft rotatably mounted in said last mentioned means; a spider bracket secured to said shaft; a plurality of spindles rotatably mounted on said bracket, said spindles each being adapted to support an article of food impaled thereon; means for yieldably resisting rotative movement of the individual spindles; an elongate crank detachably connected to said shaft for rotating the same from a distance; star wheels having spaced radial projections on each spindle; a projection on said arm in position to be successively engaged by a projection of each of the individual star wheels during rotation of the bracket for imparting limited rotative movement to the individual spindles about their own axes.

2. In combination: a supporting arm including a flat strip of material having a clamp at one end for securing the arm to an upright or the like and having its opposite end bent back on itself to form a rearwardly extending side portion parallel to the main body of the strip, said side and main portions of said strip being provided with aligned apertures; a shaft rotatably mounted in said apertures; a spider bracket secured to said shaft on one side of said arm; a plurality of spindles rotatably mounted on said bracket, said spindles each being adapted to support an article of food impaled thereon; means for yieldably resisting rotative movement of the individual spindles; an elongate crank detachably connected to said shaft on the side of said arm opposite to said bracket for rotating the same from a distance; spaced radial projections on each spindle; a projection on said arm in position to be successively engaged by a projection on each of the individual spindles during rotation of the bracket for imparting limited rotative movement to the individual spindles about their own axes.

BRUCE M. PARSONS.